June 30, 1964  F. P. DE NEGRI  3,139,613
SHAFT ENCODER APPARATUS
Filed Feb. 16, 1960  4 Sheets-Sheet 1

INVENTOR.
FRED P. DE NEGRI
BY
Gerald Dunstwitz
AGENT

June 30, 1964    F. P. DE NEGRI    3,139,613
SHAFT ENCODER APPARATUS

Filed Feb. 16, 1960    4 Sheets-Sheet 3

INVENTOR.
FRED P. DE NEGRI
BY
AGENT

June 30, 1964  F. P. DE NEGRI  3,139,613
SHAFT ENCODER APPARATUS
Filed Feb. 16, 1960  4 Sheets-Sheet 4

INVENTOR.
FRED P. DE NEGRI
BY
*Gerald Durstewitz*
AGENT

United States Patent Office 3,139,613
Patented June 30, 1964

3,139,613
SHAFT ENCODER APPARATUS
Fred P. De Negri, Wyckoff, N.J., assignor to The Bendix Corporation, a corporation of Delaware
Filed Feb. 16, 1960, Ser. No. 8,998
17 Claims. (Cl. 340—347)

The present invention relates to encoders and, more particularly, to encoders for converting analog information into digital information.

In digital computer applications where the rotational position of a shaft defines one of the variables used in the computation, it is necessary to convert the shaft position into a digital representation which can be utilized by the computing apparatus. The shaft may be rotated in response to a variable condition, such as altitude, attitude, temperature, antenna position, etc.

It is an object of the present invention to provide improved encoding apparatus for converting the rotational position of a shaft into a digital output.

Another object is to provide such apparatus for converting the rotational position of a shaft into a digital output proportional to a trigonometric function of the angle of rotation of the shaft.

Another object is to provide in such apparatus means for determining the quadrant of the angle of rotation of the shaft.

Another object is to provide such apparatus capable of producing an output continuously defining the rotational position of a rotating shaft.

Another object is to provide such apparatus for producing an output which is synchronized with the rotational position of a shaft.

Another object is to provide such apparatus for producing an output which can be re-synchronized upon command.

A further object is to provide such apparatus for producing an output which is automatically synchronized each time power is applied to the apparatus.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
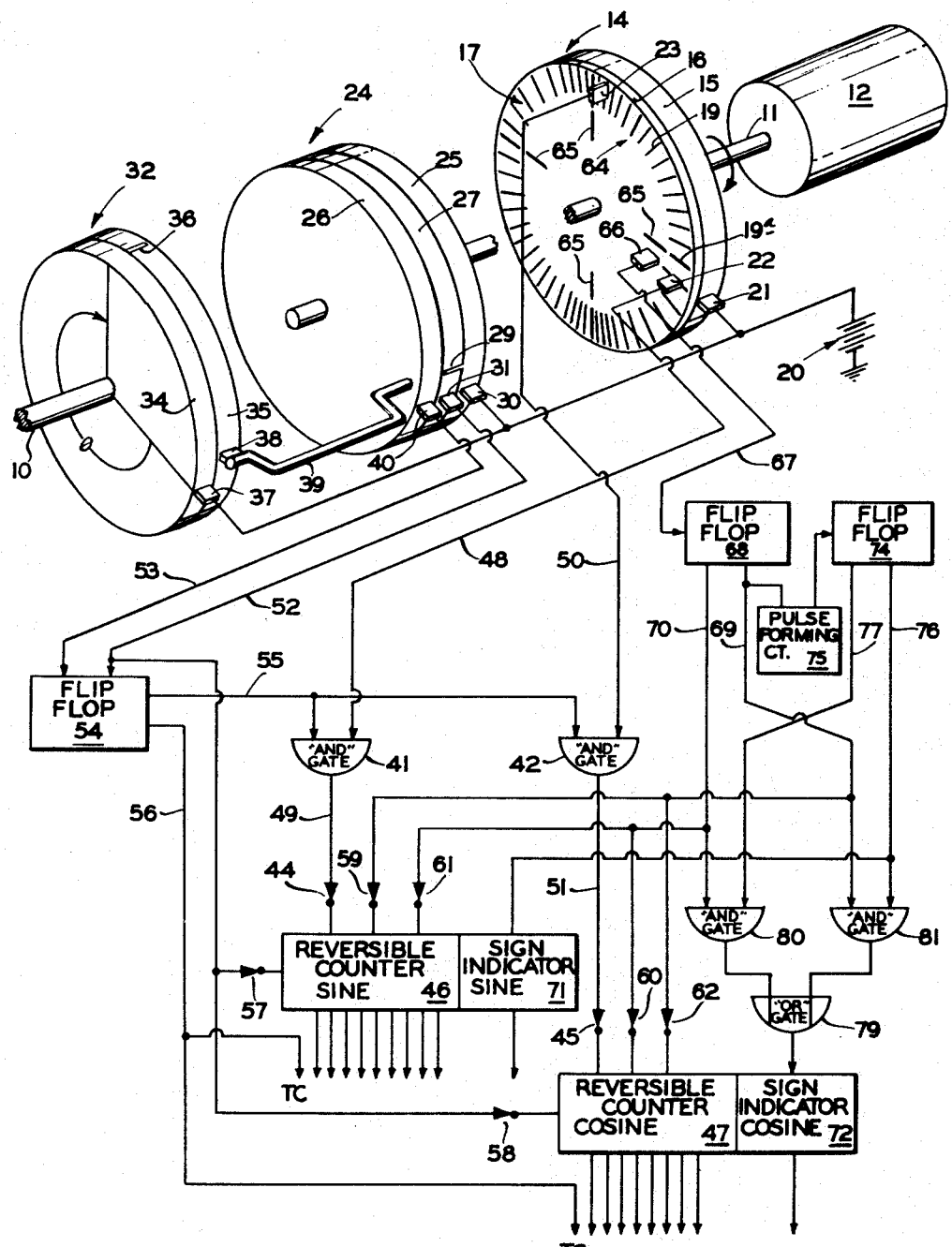
FIGURE 1 is a schematic diagram of a novel encoder constructed in accordance with the present invention.

Referring to the drawings in detail and more particularly to FIGURE 1 thereof, there is shown one embodiment of the encoder of the present invention for encoding the rotational position of a shaft 10. Adjacent one end of the shaft 10 and coaxial therewith is positioned a shaft 11 continuously driven by a motor 12 in the direction indicated by the arrow. Mounted on the shaft 11 for rotation therewith is a pulse wheel 14 including an electrically conductive disc 15 and a disc 16 of insulating material attached thereto. The disc 16 is provided with an outer pulse track 17 formed by a plurality of contacts 19 sinusoidally distributed and in electrical contact with the conductive disc 15.

An electrical potential is placed on the disc 15 from a battery 20 through a brush 21, and a pair of pickup brushes 22 and 23 are positioned adjacent the disc 16 to engage the contacts 19 and receive a pulse each time a contact is engaged thereby.

A second pulse wheel 24 is also mounted on the shaft 11 for rotation therewith and includes a pair of electrically conductive discs 25 and 26 separated and insulated from one another by a disc 27 of insulating material. The disc 27 is provided with a single contact 29 positioned on the circumference thereof and in electrical contact with the conductive disc 25. An electrical potential is placed on the disc 25 from the battery 20 through a brush 30, and a pickup brush 31 aligned with the pickup brush 22 engages the periphery of the disc 27 to receive a pulse when contacted by the contact 29.

The brush 31 defines a stationary reference point from which the rotational displacement of the shaft 11 is measured, and the contact 29 provides a reference defining the rotational position of the shaft 11. When the contact 29 is aligned with the brush 31 the shaft 11 is in a position of zero rotational displacement and a contact 19a on the pulse track 17 is aligned with the brush 22. The contacts 19 which subsequently engage the brush 22 as the shaft 11 rotates are located at positions displaced from the contact 19a by angles having sines which differ from the sines of the angles of adjacent contact positions, by a uniform amount. The spacing between contacts, therefore, gradually increases during the first and third 90 degrees of rotation and gradually decreases during the second and fourth 90 degrees of rotation.

Each pulse produced at the pickup 22 subsequent to the engagement of the contact 29 and the pickup brush 31 represents a uniform change, since the preceding pulse, in the sine of the angle through which the contact 29 has rotated from the position of the pickup brush 31.

The pickup brush 23 is displaced 90 degrees from the pickup 22 and, therefore, each pulse produced thereby represents a uniform change (since the preceding pulse) in the cosine of the angle through which the contact 29 has rotated from the position of the pickup brush 31.

A pulse wheel 32 is mounted on the shaft 10 and includes a conductive disc 34 and a disc 35 of insulating material provided with a single contact 36 on the outer periphery thereof and in electrical contact with the conductive disc 34. The contact 36 provides a reference defining the rotational position of the shaft 10.

An electrical potential is placed on the disc 34 from the battery 20 through a brush 37, and a movable pickup brush 38, carried by the pulse wheel 24 and aligned with the contact 29, engages the outer periphery of the disc 35 to produce a pulse when contacted by the contact 36. The movable pickup brush 38 is mounted on an electrically conductive arm 39 carried by, and in electrical contact with, the conductive disc 26. A brush 40 engages the outer periphery of the disc 26 to receive the pulse produced at the movable brush 38.

It can be seen that if the shaft 10 is positioned so that the contact 36 is displaced from the stationary reference position defined by the brush 31 by an angle θ then the pulse wheel 14 rotates through this angle θ between the time the contact 29 engages the brush 31 and the time the brush 38 engages the contact 36.

The "sine" and "cosine" pickup brushes 22 and 23 are respectively connected through "and" gates 41 and 42 to input terminals 44 and 45 of reversible binary counters 46 and 47 by means of conductors 48, 49 and 50, 51.

The brushes 31 and 40 are connected by means of conductors 52 and 53 to separate inputs of a flip-flop 54 having two outputs to which conductors 55 and 56 are connected. The flip-flop 54, which is of the type that produces a voltage on one output in response to a pulse on one input and transfers this voltage in the other output in response to a pulse on the second input, operates to energize the conductor 55 in response to a pulse from the brush 31. In response to the pulse from the brush 40, the flip-flop 54 deenergizes the conductor 55 and energizes the conductor 56. The conductor 55 is connected to the second inputs of the "and" gates 41 and 42 to control the flow of pulses from the pickup brushes 22 and 23 to the counters 46 and 47, and the conductor 56 is connected to transfer control (TC) apparatus (not shown) which transfers the information in the counters to the apparatus utilizing this information.

The brush 31 is also connected to reset terminals 57 and 58 of the counters 46 and 47, respectively. The pulse produced at the pickup brush 31 by the engagement thereof with the contact 29 operates on the counters 46 and 47 to respectively set the counters at the binary numbers corresponding to the sine and the cosine of 0 degree. This pulse from the pickup 31 simultaneously operates the flip-flop 54 to energize the conductor 55 and allow pulses to flow from the pickups 22 and 23 through the "and" gates 41 and 42 to the counters 46 and 47.

When the contact 29 has rotated through the angle θ with respect to the position of brush 31, the moving pickup brush 38 engages the contact 36 and a pulse is formed which is conducted through the arm 39 and the disc 26 to the brush 40 and through the conductor 53 to the flip-flop 54. In response to this pulse, the flip-flop 54 transfers its output from the conductor 55 to the conductor 56 thus inhibiting the gates 41 and 42 and operating the transfer control apparatus.

The counters 46 and 47 are provided with "count up" terminals 59 and 60, respectively, and "count down" terminals 61 and 62, respectively. In each of the counters, the input pulses received at the input terminal (44 or 45) are added to the count in the counter or are subtracted therefrom depending on whether the "count up" terminal (59 or 60) or the "count down" terminal (61 or 62) is energized.

The direction of operation of the counters is controlled by a second pulse track 64 having four contacts 65 provided on the disc 16 of the pulse wheel 14.

The contacts 65 are displaced 0, 90, 180 and 270 degrees with respect to the contact 19a and are in electrical contact with the conductive disc 15. A pickup brush 66 is positioned in radial alignment with the pickup 22 and adjacent the pulse wheel 14 to engage the contact 65 and produce a pulse when contacted thereby. The pickup 66 is connected by means of a conductor 67 to the input of a flip-flop 68 having two outputs to which are connected conductors 69 and 70.

In the flip-flop 68 which may be an Eccles-Jordan trigger circuit, the two outputs are alternately energized by successive pulses applied to the single input.

One of the outputs of the flip-flop 68 is connected by means of the conductor 69 to the "count up" terminal 59 of the sine counter 46 and to the "count down" terminal 62 of the cosine counter. The other of the outputs of the flip-flop 68 is connected by means of the conductor 70 to the "count down" terminal 61 of the sine counter 46 and to the "count up" terminal 60 of the cosine counter 47.

Simultaneously with the engagement of the contact 19a with the pickup 22 and the engagement of the contact 29 with the pickup 31, a contact 65 engages the pickup 66 and produces a pulse which places the flip-flop 68 in the condition which energizes the "count up" terminal 59 of the sine counter 46 and the "count down" terminal 62 of the cosine counter 47.

At this time the sine counter 46 is set to the binary number corresponding to the sine of 0 degree and the cosine counter 47 is set to the binary number corresponding to the cosine of 0 degree as previously described.

During the next 90 degrees of rotation of the shaft 11, the pulses from the pickup 22 are added to the count within the sine counter and the pulses from the pickup 23 are substracted from the count within the cosine counter.

After each 90 degrees of revolution of the shaft 11, another contact 65 engages the pickup 66 and produces a pulse which causes the flip-flop 68 to reverse the direction of operation of each of the counters 46 and 47 so that the count in the counters is at all times proportional to the sine and cosine of the angle through which the contact 29 has rotated from the position of the brush 31.

A sign of the sine indicator 71 and a sign of the cosine indicator 72 are provided for the counters 46 and 47, respectively, to determine the quadrant in which the contact 29 is positioned at any time. A flip-flop 74, of the same type as the flip-flop 68 and in conjunction with, is used for controlling the sign indicators 71 and 72. The input of the flip-flop 74 is connected through a pulse flip-flop 68, and the outputs of the flip-flop 74 are connected to conductors 76 and 77. The input of the sign of the sine indicator 71 is connected directly to the conductor 76 and the input of the sign of the cosine conductor 72 is connected to the output of an "or" gate 79 having its inputs connected to the outputs of two "and" gates 80 and 81. The inputs of the "and" gate 80 are connected to the flip-flop output conductors 70 and 77 and the inputs of the "and" gate 81 are connected to the flip-flop output conductors 69 and 76.

The indicators 71 and 72, which can be flip-flops, relays, or equivalent, individually produce an output indicating that the respective function (sine or cosine) of the angle of the contact 29 (with respect to the brush 31) is positive when the input thereto is energized and negative when the input thereto is not energized.

As previously described, when the contact 65, which is radially aligned with the contact 19a, engages the pick-up 66, the flip-flop 68 energizes the conductor 69 and deenergizes the conductor 70. In response to the energization of the conductor 69, the pulse forming circuit 75 forms a pulse causing the flip-flop 74 to energize the conductor 76 and deenergize the conductor 77.

The input of the sine indicator 71 is energized by its connection to the energized conductor 76 and the input of the cosine indicator 72 is energized through the "or" gate 79 by the output of the "and" gate 81. The indicators 71 and 72 therefore indicate that both the sine and cosine of the angle of the contact 29 is positive thus defining the angle as being in the first quadrant.

As the contact 29 enters the second quadrant a second pulse produced at the pickup 66 causes the flip-flop 68 to reverse its condition energizing the conductor 70 and deenergizing the conductor 69. The circuit 75 does not produce a pulse in response to the removal of the output of the flip-flop 68 from the conductor 69, therefore, the condition of the flip-flop 74 does not change and the input of the sign of the sine indicator 71 remains energized. The sign of the cosine indicator 72 is now deenergized since neither of the "and" gates 80 or 81 have both inputs energized. The indicators 71 and 72, therefore, indicate that the sine of the angle of the contact 29 is positive and the cosine of the angle is negative thus defining the angle as being in the second quadrant.

As the contact 29 enters the third quadrant a third pulse from the pickup 66 causes flip-flop 68 to again reverse its condition energizing the conductor 69 and deenergizing the conductor 70. The pulse circuit 75 in response to the output on the conductor 69 produces a pulse causing the flip-flop 74 to reverse its condition energizing the conductor 77 and deenergizing the conductor 76. The input of the sine indicator 71 is thereby deenergized, and the input of the cosine indicator 72 remains deenergized since neither of the "and" gates 80 or 81 have both inputs energized. The indicators, therefore, indicate that both the sine and the cosine of the angle of the contact are negative and define the angle as being in the third quadrant.

As the contact 29 enters the fourth quadrant the condition of the flip-flop 68 is again reversed energizing the conductor 70 and deenergizing the conductor 69. The flip-flop 74 remains in its previous condition energizing the conductor 77, therefore, the input of sign of the sine indicator 71 is deenergized and the input of the sign of the cosine indicator 72 is energized through the "or" gate 79 from the output of the "and" gate 80. The indicators, therefore, indicate that the sine of the angle is negative and the cosine is positive thus indicating that the angle is in the fourth quadrant.

The outputs of the indicators 71 and 72 are also transferred to the utilizing apparatus (not shown) when the conductor 56 is energized in response to the engagement of contact 36 and pickup 38.

It may be seen that during each revolution of the shaft 11, the position of the shaft 10 at the instant when the pickup 38 engages the contact 36, is determined. If the shaft 10 is rotating, the shaft 11 is rotated at a much greater speed than that of the shaft 10 and the encoder provides periodic determinations of the position of the shaft.

Figure 2:
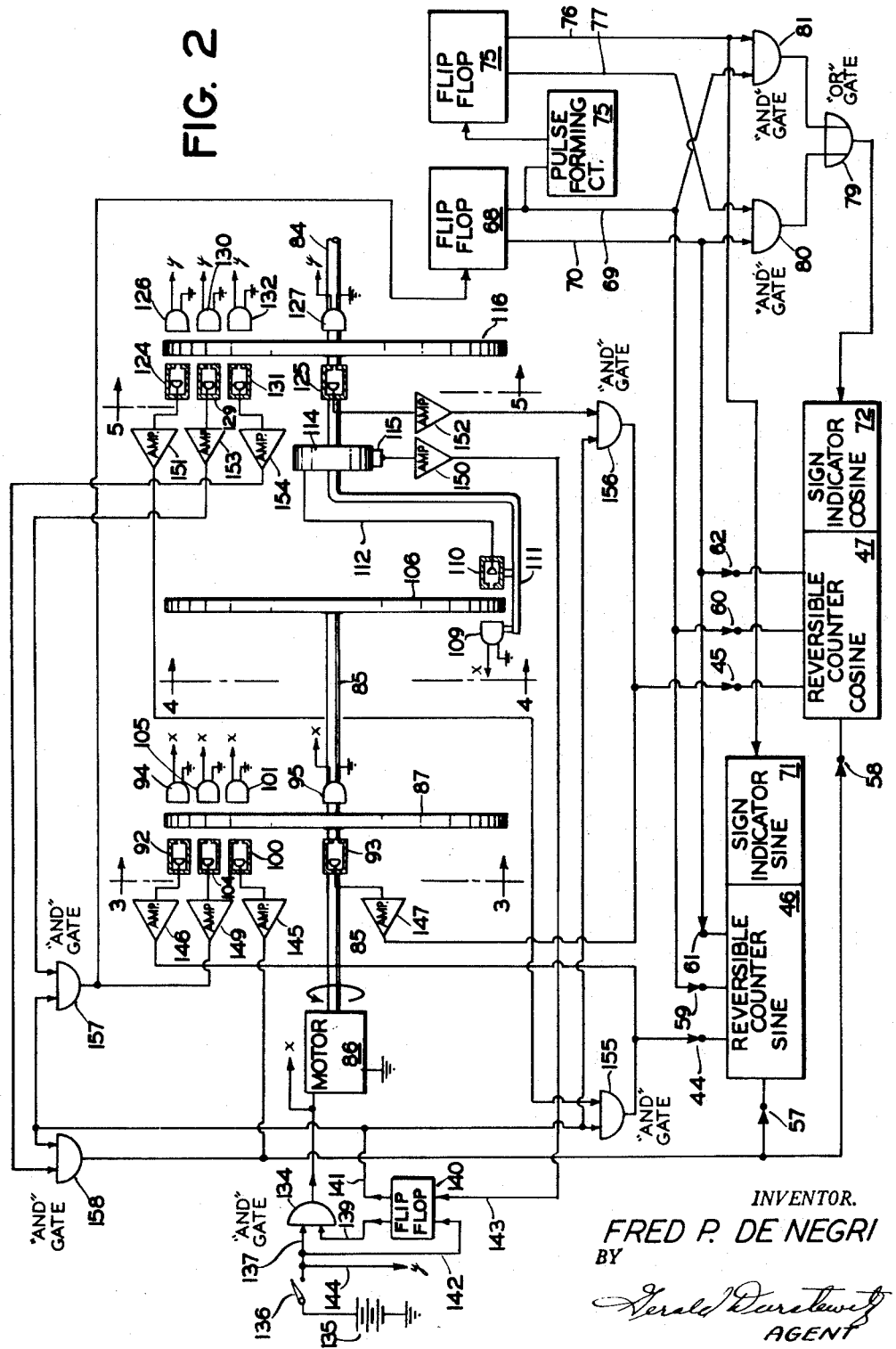
FIGURE 2 is a schematic diagram showing another embodiment of the invention.
Figure 3:
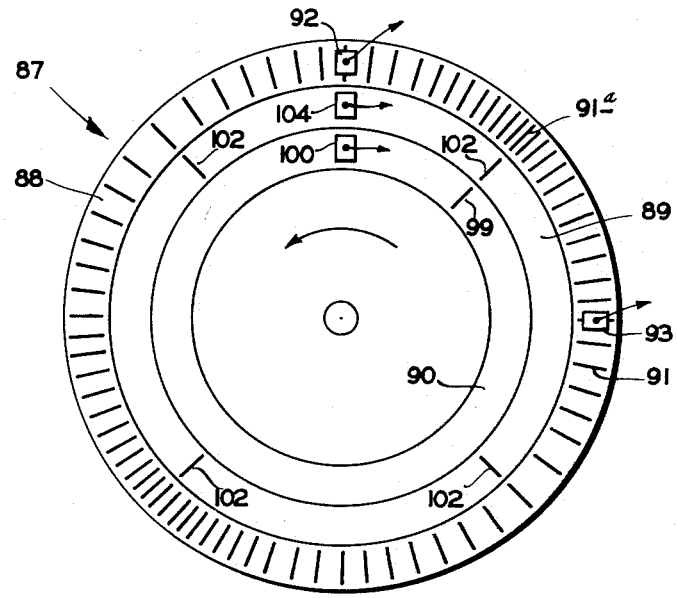
FIGURE 3 is a view taken along line 3—3 in FIGURE 2 illustrating the details of a pulse wheel.

In FIGURE 2 there is shown a modification of the encoder of FIGURE 1 wherein the rotational position of a shaft 84 is encoded in a manner to provide in the counters 46 and 47 a continuous determination of the position of the shaft. Adjacent one end of the shaft 84 and coaxial therewith is positioned a shaft 85 coupled to a motor 86 to be driven thereby. Mounted on the shaft 85 for rotation therewith is a pulse wheel 87 carrying three concentric pulse tracks 88, 89 and 90 as shown in FIGURE 3. The outer pulse track 88 is formed with a plurality of sinusoidally distributed slits 91. A pair of photoelectric pickups 92 and 93 are positioned adjacent the pulse track 88 on one side of the wheel 87 to receive light through the slits 91 from lamps 94 and 95, respectively. Each time a slit 91 comes into alignment with one of the pickups 92 or 93, the pickup receives a pulse of light from the lamp associated therewith and produces an electrical pulse at its output.

The inner pulse track 90 is provided with a single slit 99, and a photoelectric pickup 100 is positioned on one side of the wheel 87 adjacent the track 90 to receive light through the slit 99 from a lamp 101. When the slit 99 is aligned with the pickup 100, the pickup is energized by light from the lamp 101 and produces an electrical pulse denoting that the shaft 85 is in a position of 0 degree rotational displacement.

At this time a slit 91a on the pulse track 88 is aligned with the pickup 92. Each of the slits 91 which subsequently become aligned with the pickup 92 are positioned with respect to the slit 91a in the same manner that the contacts 19 are positioned with respect to the contact 19a in the encoder of FIGURE 1. The pulses produced by the pickup 92, therefore, each represent a uniform change in the sine of the angle through which the shaft 85 has rotated since the alignment of the slit 99 with the pickup 100.

The pickup 93 and the lamp 95 are displaced 90 degrees from the pickup 92 and the lamp 94, therefore, each pulse produced by the pickup 93 represents a uniform change in the cosine of the angle through which the shaft 85 has rotated since the alignment of the slit 99 and the pickup 100.

The third pulse track 89 is formed with four slits 102 displaced 0, 90, 180, and 270 degrees from the slit 99. A photoelectric pickup 104 is positioned adjacent the track 89 in radial alignment with the pickup 92 to receive light through the slits 102 from a lamp 105. When a slit 102 comes into alignment with the pickup 104, the pickup produces a pulse which denotes that the angle of displacement of the shaft 85 has entered a new quadrant.

Figure 4:
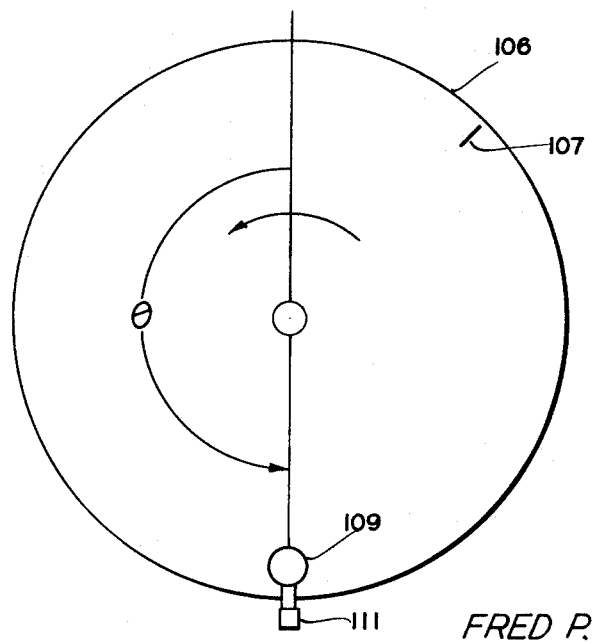
FIGURE 4 is a view taken along line 4—4 in FIGURE 2 illustrating the details of a second pulse wheel.

Also mounted on the shaft 85 is a second pulse wheel 106 carrying a single slit 107 (FIGURE 4) which is aligned with the slit 99 of the track 90 on the wheel 87.

A lamp 109 and a photoelectric pickup 110 are mounted on an arm 111 extending from the shaft 84 and positioned on opposite sides of the pulse wheel 106 to cooperate with the slit 107. The pickup 110 provides a reference defining the rotational position of the shaft 84. When the slit 107 is aligned with the pickup 110, the pickup produces a pulse which denotes that the shafts 84 and 85 are in the same rotational position. It can be seen that if the shaft 84 is positioned so that the pickup 110 is displaced from the stationary reference position defined by the pickup 100 by an angle $\theta$, then the pulse wheel 85 rotates through this angle $\theta$ between the time the slit 99 passes the pickup 100 and the time the slit 107 passes the pickup 110.

The output of the pickup 110 is connected by means of a conductor 112 to a slip ring 114 mounted on the shaft 84 and engaged by a brush 115.

Figure 5:
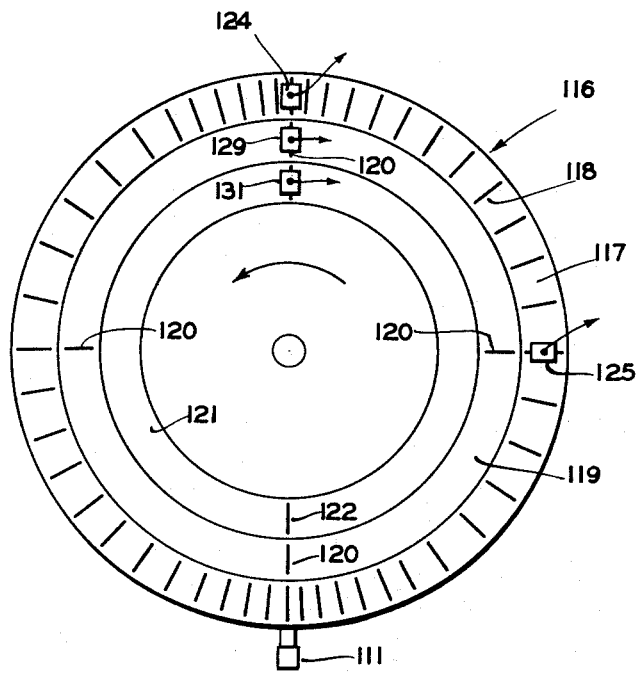
FIGURE 5 is a view taken along line 5—5 in FIGURE 2 illustrating the details of a third pulse wheel.

Mounted on the shaft 84 for rotation therewith is a pulse wheel 116 identical to the pulse wheel 87 and having, as shown in FIGURE 5, an outer track 117 provided with sinusoidally distributed slits 118, a middle track 119 provided with four slits 120, and an inner track 121 provided with a single slit 122.

Positioned adjacent the wheel 116 are: two photoelectric pickups 124, 125 axially aligned with the pickups 92 and 93 to receive light through the slits 118 from lamps 126 and 127, respectively; a photoelectric pickup 129 axially aligned with the pickup 104 to receive light through the slits 120 from a lamp 130; and a pickup 131 axially aligned with the pickup 100 to receive light through the slit 122 from a lamp 132.

The wheel 116 is positioned on the shaft 84 with the reference slit 122 in radial alignment with the pickup 110 on the arm 111.

The motor 86 and the lamps 94, 95, 101, 105, and 109 receive electrical power from the output of an "and" gate 134 having an input connected to an electrical source 135 through a switch 136 and a conductor 137.

The other input of the gate 134 is connected through a conductor 139 to an output of a flip-flop 140 to be controlled thereby. The flip-flop 140 is provided with a second output connected to a conductor 141 and with two inputs having conductors 142 and 143 connected thereto. The input conductor 142 is connected to the "and" gate input conductor 137, and the flip-flop 140 is constructed to produce an output on the conductor 139 when the input conductor 142 is energized and to produce an output on the conductor 141 when the input conductor 143 is energized.

When the switch 136 is initially closed energizing the conductor 137, the flip-flop 140 produces an output on the conductor 139 to activate the "and" gate 134 and supply electrical energy to the motor 86 and the lamps 94, 95, 101, 105 and 109 to rotate shaft 85 and illuminate the lamps.

When the slit 99 passes between the pickup 100 and the lamp 101, the pickup 100 produces a pulse which is amplified in an amplifier 145 and applied to the reset terminals 57 and 58 of the counters 46 and 47 to set into the counter 46 the binary number corresponding to the sine of 0 degree and to set into the counter 47 the binary number corresponding to cosine of 0 degree.

The pulses from the pickups 92 and 93 are respectively amplified in amplifiers 146 and 147 and applied to the input terminals 44 and 45 of the counters 46 and 47 to modify the information stored therein in the manner described in connection with the embodiment of FIGURE 1.

The output pulses from the pickup 104 are amplified in an amplifier 149 and applied to the flip-flop 68 to control the direction of operation of the counters and to control the sign indicators as described in connection with the embodiment of FIGURE 1.

When the shaft 85 has rotated through the angle θ from the position of the pickup 100, the slit 107 in the wheel 106 passes between the lamp 109 and the pickup 110, and the pickup 110 produces a pulse which is amplified by an amplifier 150 and applied to the input conductor 143 of the flip-flop 140. The flip-flop 140 responds to this pulse and transfers its output from the conductor 139 to the conductor 141, thus inhibiting the gate 134.

The motor 86 is deenergized and the lamps 94, 95, 101, 105 and 109 are extinguished preventing the pickups 92, 93, 100, 104 and 110 from producing additional output pulses.

At this time the pulse wheel 87 is in exact alignment with the pulse wheel 116 so that any rotation of the wheel 116 subsequent to this time produces pulses in the pickups 124, 125, 129 and 131 which are representative of the change in the rotational position of the shaft 84.

The lamps 126, 127, 130 and 132 receive power through a conductor 144 connected to the conductor 137 and therefore are illuminated to energize the pickups 124, 125, 129 and 131 upon the actuation of the switch 136.

The outputs of the pickups 124, 125, 129 and 131 are each respectively connected through an amplifier 151, 152, 153 and 154 to an input terminal of an "and" gate 155, 156, 157, 158. Each of the "and" gates 155, 156, 157 and 158 has its other input connected to the output conductor 141 of the flip-flop 140 and therefore these gates are inhibited during the above described period when the flip-flop output conductor 139 is energized.

When the aforementioned pulse from the pickup 110 actuates the flip-flop 140 energizing the output conductor 141, the gates 155, 156, 157 and 158 are activated to pass the pulses produced by the pickups 124, 125, 129 and 131 in response to rotation of the shaft 84.

The pulses from the pickups 124 and 125 are then respectively applied to the input terminals 44 and 45 of the counters 46 and 47 while the pulses from the pickup 129 are applied to the flip-flop 68 and the pulse from the pickup 131 is applied to the counter reset terminals 57 and 58.

Since the wheels 87 and 116 are in alignment when this transfer takes place, the pulses produced by the pickups 124 and 125 in response to rotation of the shaft 84 to a new position have the same spacing as the pulses which would have been produced by the pickups 92 and 93 if the wheel 87 had been rotated to this new position.

It may be seen, therefore, that the pulses produced by the pickups 124, 125, 129 and 131 operate on the counters 46 and 47 and the flip-flop 68 in the same manner as the pulses from the pickups 92, 93, 100 and 104 to provide a continuous determination of the rotational position of the shaft 84. The counters 46 and 47, therefore, are synchronized with the pulse wheel 116 and may be resynchronized upon command by opening and reclosing the switch 136. Also, if the electrical source 135 should fail the counters will be resynchronized automatically when power is restored.

From the foregoing it will be seen that the present invention provides improved encoding apparatus which converts the rotational position of a shaft into a digital output proportional to a trigonometric function of the angle of rotation of the shaft.

Although two embodiments of the invention have been illustrated and described in detail, it is to be expressly understood that the invention is not limited thereto. Various changes can be made in the design and arrangement of the parts without departing from the spirit and scope of the invention as will now be understood by those skilled in the art.

What is claimed is:

1. Apparatus for determining the angle of rotation of an element in accordance with a function of a variable which both increases and decreases as the element rotates in one direction, comprising means for producing a number of pulses in accordance with said function and related to said angle of rotation of said element, reversible counting means for counting said pulses, and means for reversing said counting means when the variable changes from an increasing to a decreasing value and from a decreasing to an increasing value.

2. Apparatus for determining the angle of rotation of an element in accordance with a function of a variable which both increases and decreases as the element rotates in one direction, comprising means for producing a number of pulses in accordance with said function and related to said angle of rotation of said element, reversible counting means for counting said pulses, and means for reversing said counting means after a predetermined number of pulses have been counted thereby.

3. Apparatus for determining the angle of rotation of an element from a reference position in accordance with a reversing function of a variable which both increases and decreases as the element rotates in one direction, comprising means for producing a number of pulses in accordance with the function and related to said angle of rotation of said element, said pulses being separated by intervals related to the reversing function of said angle of rotation of said element, reversible counting means for counting said pulses, and means for reversing said counting means when said function reverses.

4. Apparatus for determining the angle of rotation of an element from a reference position in accordance with a reversing function of a variable which both increases and decreases as the element rotates in one direction, comprising means for producing a number of pulses in accordance with the function and related to said angle of rotation of said element, and separated by intervals continuously changing in length in a periodically reversing direction in accordance with the function, reversible counting means for counting said pulses, and means for reversing said counting means in response to a reversal in the direction in which the intervals between said pulses change.

5. Apparatus for determining the angle of rotation of an element from a reference position in accordance with a reversing function of a variable which both increases and decreases as the element rotates in one direction, comprising means for producing pulses separated by intervals continuously changing in length in a periodically reversing direction in accordance with the function, successive ones of said pulses defining progressive rotational positions displaced from the reference position by angles which differ in a predetermined functions by a predetermined amount, reversible counting means, means for delivering to said counting means said pulses defining each of said progressive rotational positions between said reference position and said angle of rotation of said element, and means for reversing said counting means each time the direction of interval change reverses.

6. Apparatus for determining the angle of rotation of an element from a reference position in accordance with a predetermined trigonometric function of a variable which both increases and decreases, comprising means for producing a number of pulses at graduated intervals in accordance with the trigonometric function of said angle of rotation of said element, each of said pulses defining an angle of rotation which differs in said trigonometric function from the angles of rotation defined by adjacent pulses by a predetermined amount, reversible counting means for counting said pulses, and means for controlling the direction of operation of said counting means in accordance with the quadrant positions of said angles of rotation defined by said pulses.

7. Apparatus for determining the angle of rotation of an element from a reference position in accordance with a predetermined trigonometric function of a variable which both increases and decreases, comprising means for producing pulses at graduated intervals, successive ones of said pulses defining progressive angles of rotation from said reference position differing in accordance with the trigonometric function by a predetermined amount, reversible counting means, means for delivering to said counting means said pulses defining each of said progressive angles of rotation between said reference position and said angle of rotation of said element, and means for controlling the direction of operation of said counting means in accordance with the quadrant positions of said progressive angles of rotation.

8. Apparatus for determining the angle of rotation of an element from a reference position in accordance with a predetermined function of a variable which both increases and decreases, comprising a second element adjacent said first element, means controlled by the rotation of said second element for producing pulses separated by intervals continuously changing in length in a periodically reversing direction, successive ones of said pulses defining cumulative positions of said angle of rotation of said first element which differ in accordance with the function by a uniform amount, reversible pulse counting means, means for rendering said counting means responsive to said pulses when said second element is in a rotational position corresponding to said reference position, means for rendering said counting means unresponsive to said pulses when said second element is in a rotational position corresponding to the rotational position of said first element, and means for reversing said counting means in response to a reversal in the direction in which the intervals between said pulses change.

9. Apparatus for determining the angle of rotation of an element from a reference position in accordance with a predetermined trigonometric function of a variable which both increases and decreases, comprising a second element adjacent said first element, means for rotating said second element through an angle equal to said angle of rotation of said first element, means for producing a pulse during said rotation of said second element each time the trigonometric function of the angle of rotation of said second element changes by a predetermined amount, reversible counting means for counting said pulses, and means for controlling the direction of operation of said counting means in accordance with the quadrant position of said angle of rotation of said first element.

10. Apparatus for determining the rotational position of an element in accordance with a predetermined trigonometric function of a variable which both increases and decreases, comprising a second element adjacent said first element, means rotated by said second element carrying a position of rotational reference, a stationary reference point adjacent said second element, means operated by the rotation of said second element for producing a pulse each time the trigonometric function of the angle of rotation of said second element with respect to said stationary reference changes by a predetermined amount, reversible signal counting means connected to said pulse producing means, second pulse producing means having cooperative portions positioned at said rotational reference position and said stationary reference point for rendering said counting means responsive to said first pulse producing means in response to the alignment of said rotational reference position with said stationary reference point, means rotated by said first element carrying a position of rotational reference, third pulse producing means having cooperative portions positioned at said first and second rotational reference positions for rendering said counting means unresponsive to said first pulse producing means in response to the alignment of said rotational positions, and fourth pulse producing means having a cooperative portion rotated by one of said elements and a stationary cooperative portion for reversing the operation of said counting means when the angle of rotation of said second element changes quadrants.

11. Apparatus for determining the angle of rotation of an element rotationally positioned in accordance with a function of a variable which both increases and decreases as the element rotates in one direction, comprising a position indicating disc rotated by said element, a second rotatable element positioned adjacent said first element, means for rotating said second element, a second position indicating disc rotated by said second element, a pulse track on said second disc having a single pulse mark, a stationary pickup positioned adjacent said pulse track to cooperate with said pulse mark to produce a pulse, a second pulse track on one of said discs having a single pulse mark, an arm rotated with the other of said discs having a portion adjacent said second pulse track, a second pickup supported by said portion of said arm to cooperate with said pulse mark on said second pulse track to produce a pulse, a third disc rotationally related to said second disc and having a pulse track provided with a plurality of pulse marks, a third pickup positioned adjacent said third disc to cooperate with said pulse marks thereon to produce a plurality of pulses, and reversible means for counting said pulses from said third pickup which are produced between said pulse from said first pickup and said pulse from said second pickup, and means for reversing the counting means when the variable changes from an increasing to a decreasing value and from a decreasing to an increasing value.

12. Position sensing apparatus for determining the rotational position of an element with respect to a reference position in accordance with a function of a variable which both increases and decreases as the element rotates in one direction, comprising reversible signal counting means, means for initially delivering to said counting means signals indicating an initial rotation displacement of said element with respect to said reference position, and means responsive to rotation of said element for subsequently delivering to said counting means signals indicating changes in the rotational position of said element, and means for reversing the counting means when the variable changes from an increasing to a decreasing value and from a decreasing to an increasing value.

13. Position sensing apparatus for continuously determining the rotational position of an element with respect to a reference position in accordance with a function of a variable which both increases and decreases, comprising a rotating second element adjacent said first element, means for producing a train of signals defining increments of rotation of said second element, means for producing a train of signals defining increments of rotation of said first element, reversible signal counting means initially responsive to said first train of signals, means for rendering said counting means responsive to said second train of signals when the rotational position of said second element corresponds to the rotational position of said first element, and means for reversing the counting means when the variable changes from an increasing to a decreasing value and from a decreasing to an increasing value.

14. Position sensing apparatus for continuously determining the rotational position of an element in accordance with a function of a variable which both increases and decreases as the element rotates in one direction, comprising a rotating second element adjacent said first element having a reference position, means for producing a train of signals defining increments of rotation of said second element, means for producing a train of signals defining increments of rotation of said first element, means for initially counting the signals of said first train as said second element rotates from said reference position to a position corresponding to the position of said first element and subsequently counting the signals of said second train, and means for reversing the counting means when the variable changes from an increasing to a decreasing value and from a decreasing to an increasing value.

15. Position sensing apparatus for continuously determining the rotational position of an element with respect to a reference position in accordance with a function of a variable which both increases and decreases, comprising a rotating second element adjacent said first element, means for producing a train of signals defining increments of rotation of said second element, means for producing a train of signals defining increments of rotation of said first element, reversible signal counting means, means for producing an electrical control signal, means for producing a second electrical control signal when the rotational position of said second element corresponds to the rotational position of said first element, means responsive to said first control signal to establish a flow of pulses from said first pulse producing means to said counting means and responsive to said second control signal to interrupt said flow of pulses from said first pulse producing means and establish a flow of pulses from said second pulse producing means to said counting means, and means for reversing the counting means when the variable changes from an increasing to a decreasing value and from a decreasing to an increasing value.

16. Position sensing apparatus according to claim 11 wherein said first-mentioned control signal producing means provides power for said apparatus.

17. Apparatus for determining the angle of rotation of a member function of a variable which both increases and decreases as the element rotates in one direction, comprising a second member adjacent said first member, means for rotating said second member, a pulse wheel rotated by said second member, a pulse track on said wheel having a single pulse mark, a pickup positioned adjacent said pulse track to cooperate with said pulse mark to produce a pulse, a second pulse wheel rotated by said second member, a pulse track on said second wheel having a single pulse mark aligned with said pulse mark on said first wheel, an arm rotated by said first element having a portion adjacent said pulse track on said second wheel, a pickup mounted on said arm portion to cooperate with said pulse mark on said second wheel to produce a pulse, a second pulse track on said first wheel having a plurality of pulse marks, a third pickup positioned adjacent said second pulse track to cooperate with said plural pulse marks to produce pulses, reversible means for counting said pulses produced by said third pickup between said pulse produced by said first pickup and said pulse produced by said second pickup, and means for reversing the counting means when the variable changes from an increasing to a decreasing value and from a decreasing to an increasing value.

References Cited in the file of this patent
UNITED STATES PATENTS

| 2,656,106 | Stabler | Oct. 20, 1953 |
| 2,770,798 | Roth | Nov. 13, 1956 |
| 2,775,755 | Sink | Dec. 25, 1956 |
| 2,901,170 | Poole | Aug. 25, 1959 |